United States Patent Office 3,056,676
Patented Oct. 2, 1962

3,056,676
POLYMERIC FILM AND PROCESS OF PREPARATION
Robert William Hendricks, Wilmington, Del., assignor to E. I. du Pont de Nemours and Company, Wilmington, Del., a corporation of Delaware
No Drawing. Filed June 23, 1959, Ser. No. 822,199
5 Claims. (Cl. 96—87)

This invention relates to an improved photographic film. More particularly, it relates to a new strong polyacrylonitrile photographic film and the process for preparing it.

Films of acrylonitrile polymers have properties that make them particularly desirable for use as photographic film bases. Such films, particularly those of the homopolymer polyacrylonitrile, are not substantially affected by changes in temperature. They have an equally low sensitivity to changes in humidity. The use of acrylonitrile polymeric film as a photographic film base, therefore, would eliminate two very bothersome factors in the preparation and storage of photographic film. However, the polyacrylonitrile films heretofore known to the trade are much too brittle for use as a photographic film base. Processes for eliminating this drawback such as orientation of the polyacrylonitrile film have been difficult to devise.

In a recent patent application, U.S. application Serial No. 739,181 filed June 2, 1958, by M. F. Bechtold and assigned to the assignee of the present application, a successful process for orienting polyacrylonitrile films is presented. The process improves the toughness and strength of polyacrylonitrile films by orienting the material in the usual two directions but in an unusual sequence of steps. Specifically, the process comprises dispersing an acrylonitrile polymer in the form of discrete particles having a size less than about 15 microns in a liquid medium comprising water and a solvent metal salt for said polymer dissolved therein, the salt being present in an amount such that the molar ratio of polymer (calculated as an equal weight of monomer) to solvent metal salt is at least 0.5 but less than 6, but in an amount insufficient to form a salt solution which dissolves the polymer; forming the resulting dispersion into the shape of a film; evaporating water from the film until coalescence occurs; stretching the resulting film containing the salt and water in a gaseous atmosphere to elongate at least one dimension of the film while maintaining the molar ratio of polymer to salt in the film within the range of at least 0.5 and less than 6 and maintaining the mole percent water between about 30 and 80; and thereafter washing salt from the resulting stretched film and drying the stretched film while maintaining said film under tension to restrict dimensional change of the film during washing and drying. The "mole percent water" is expressed as part of the sum of the mole percentages of water, salt and polymer, the total equaling 100%. The solvent metal salts should be sufficiently soluble in water to yield 10% solutions, and preferably at least 30% solutions. Furthermore, concentrated aqueous solutions of the salts must be capable of dissolving the acrylonitrile polymers at some temperature up to the boiling point of the salt solution, e.g., from 0°–175° C. and generally at 25°–90° C.

The primary object of the present invention is to provide a photographic film utilizing an oriented acrylonitrile polymeric film as the base film. Another object is a process for preparing such a photographic film in which the toughness and strength of the base film are not sacrificed. A further object is to provide a photographic film from which flaking or scratching off of the photographic salt is prevented. Other objects will appear hereinafter.

The objects are accomplished by a photographic film comprising an oriented polyacrylonitrile film, preferably biaxially stretched at least 1.5 times its original dimensions in each of two mutually perpendicular directions, impregnated with particles of a silver halide (silver bromide, silver iodide or silver chloride) to a depth of at least 1% of the thickness of the polyacrylonitrile film to a maximum depth, the maximum depth being such as to leave at least 50% of the thickness of the oriented polyacrylonitrile film free of impregnated particles. The importance of the lower limit, 1%, is in providing adequate adhesion between the particles and the base film and to avoid the danger of abrading the photosensitive particles from the film. The upper limit, 50%, is critical in avoiding unreasonable loss in the properties (strength, toughness, etc.) of the base film, the polyacrylonitrile film, due to the destruction of the orientation of the film. It should be understood that if impregnation of particles is performed from both surfaces of the film, then the maximum impregnation from each surface is 25% of the thickness of the film, i.e., 50% of the film's thickness must be left free of impregnation.

The process of the invention comprises the steps, in sequence, of treating at least one surface of an oriented film of an acrylonitrile polymer with an aqueous solution of silver nitrate, preferably a solution containing a concentration of 25–50% silver nitrate in water; removing excess silver nitrate solution from the surface of the film; exposing the treated surface of the film to at least one halogen selected from the group consisting of bromine, chlorine and iodine, said halogen in a form selected from the group consisting of halogen acid, halogen salt and free halogen to convert the silver nitrate to silver halide particles; and drying the particle-containing film.

The base film is preferably a biaxially-oriented film of polyacrylonitrile. However, oriented copolymers of acrylonitrile with alkyl acrylates (methacrylate), alkyl alkacrylates (methylmethacrylate), styrene, butadiene methacrylonitrile, vinyl stearate, vinyl acetate, vinyl chloride, N-vinyl pyrrolidone, 2-methyl-5-vinyl pyridine, vinyl arine sulfonic acids and salts thereof, etc., wherein acrylonitrile is the major component (at least 75% of the copolymer is acrylonitrile) are also contemplated for use in the present invention.

The polymeric material when treated in this invention is usually in the form of a self-supporting film. However, it may be in the form of any shaped article. The term "shaped article," as used herein, is meant to include films, sheets, fibers, fabrics, rods, tubes and the like.

The first step of the process must be critically controlled to provide the requisite amount of impregnation of the silver nitrate solution into the polyacrylonitrile article, i.e., impregnation to an extent of at least 1%, but no more than 50% of the article's thickness. To achieve this requires no special pretreatment. Silver nitrate solution induces swelling of the polyacrylonitrile article. By causing the polymeric material to swell, the silver nitrate tends to impregnate the polymeric material so that upon conversion to insoluble silver halide particles the resulting particles are firmly adhered to the acrylonitrile polymeric material. However, the extent of impregnation depends on many factors. The concentration of silver nitrate in its solution, the duration of the impregnating treatment, the temperature of the treatment, etc., all have their effect. Determining a suitable combination of conditions to provide the required 1–50% impregnation is not difficult for one skilled in the art after a minimum of experience. Usually, a treatment time of 10 seconds–2 minutes is adequate at a temperature slightly above room temperature with the preferred concentrations of silver nitrate solution to attain the required impregnation. If desired, an organic compound such as dimethylsulfoxide, dimethylformamide, butyrolactone, dimethylacetamide, N-methylpyrrolidone and the like may be used along with the silver nitrate solution to increase the rate of swelling of the acrylonitrile polymeric material by providing better wetting of the polymer and, thus, to increase the extent of impregnation.

Although treatments involving immersion of the polymeric material in a bath of silver nitrate are described in the subsequent examples, it should be understood that other modes are also useful. Brushing, spraying or painting of the polymeric material in any manner with the silver nitrate solution may be used successfully to impregnate one or both surfaces of the film.

The polyacrylonitrile films impregnated with silver nitrate are first wiped gently to remove excess solution from the surface and then converted to a photo-sensitive film by conversion of the silver nitrate to insoluble particles of silver bromide, silver iodide or silver chloride. The final concentration of particles in the polymeric material may range anywhere from 0.5% to as high as 65% of the total weight of polymer plus particles without substantially altering the physical properties of the polymeric material. However, a range of 15–45% of particles in the polymeric material has been found to be most useful.

The conversion step may be accomplished by exposing the impregnated film to the vapors of the free halogen or the halogen acid. The conversion may also be accomplished by using an aqueous solution of a soluble halide such as the alkali metal (sodium or potassium) halide or a solution of the halogen acid. This latter treatment with an aqueous solution, surprisingly, does not wash out silver salt from the film. This is probably attributable to the unexpected ability of the acrylonitrile groups of the polymeric film to hold silver ions within the structure by coordination.

The conversion treatments may be performed at room temperature (20° C.) or slightly above. The duration of the treatments should be approximately equal to the duration of the silver nitrate treatment in the previous step, i.e., at least 10 seconds and as high as 2 minutes, depending upon the thickness of the film being treated.

If desired, sensitizers such as allyl diethylthiourea or allylisothiocyanate may be added to the film during or subsequent to the conversion treatment to increase light sensitivity. These light sensitizers appear to be capable of depositing silver sulfide on the silver halide grains to increase the sensitivity of the silver halide grains to the effect of light.

The invention will be more clearly understood by referring to the examples which follow, Example 1 representing the best mode contemplated for performing the process of the invention. In the examples, all parts are by weight unless otherwise specified.

*Example 1*

Samples of two-way stretched polyacrylonitrile film were prepared in the following manner by photopolymerization from the following ingredients:

32.5 mole percent distilled acrylonitrile
15.2 mole percent zinc chloride
52.3 mole percent distilled water Hydrochloric acid and benzoin, each in an amount less than 1% based on the weight of the main ingredients, was also used in the preparation.

The resulting viscous solution was poured between two thin glass plates spaced 20 mils apart. Ultraviolet light from a bank of five 15-watt fluorescent sunlamps was radiated upon the solution for about 20 minutes. The plates were separated to leave a salt-containing polyacrylonitrile film.

The film was stretched in two mutually perpendicular directions at room temperature (23° C.) and 50% relative humidity to about 3 times its original dimensions (200% elongation) using simultaneous stretching in a machine stretcher. While in the stretcher, the film was placed in a pan to which was added water at 15° C. After about 16 hours of soaking in the cold water, the film was washed for one hour with water at 65° C. and then dried under tension for one hour at 120° C.

A sample of the two-way stretched polyacrylonitrile film, 2 mils thick, was immersed in a solution prepared from equal parts by weight of silver nitrate, water and dimethylsulfoxide for approximately 30 seconds. The film was next blotted dry with a paper towel and hydrogen chloride gas was passed over the surface on one side of the film for approximately 30 seconds. The initially clear surface became nearly opaque and white upon this treatment with hydrogen chloride. The film was then placed under a transparent sample of film which had the letter "B" inscribed on it in opaque ink, and the resulting laminar structure was placed in front of a bank of fluorescent sunlamps for approximately one minute with the silver chloride-containing film behind the lettered film. Upon removal from the lamps, the top film was peeled off and it was found that the image of the letter was visible (as a semi-transparent white-unreduced portion) on a black background of reduced silver in the bottom film. The resulting film was then washed thoroughly in a bath of saturated sodium thiosulfate to remove unreduced silver chloride and silver nitrate to "fix" the image. The excellent physical properties of the base polyacrylonitrile film were virtually unaffected by this treatment.

*Example 2*

A sample of the two-way stretched polyacrylonitrile film, 2 mils thick, prepared as in Example 1, was immersed in a saturated solution of silver nitrate for approximately 30 seconds. The film was blotted dry with a paper towel and a 50/50 weight percent mixture of hydrogen bromide gas and hydrogen iodide gas was passed over the surface on one side of the film for approximately 30 seconds. The initially clear surface became nearly opaque and pale yellow. The film was then placed under a transparent sample of film which had the letter "B" inscribed on it in opaque ink, and the resulting laminar structure was placed in front of a bank of fluorescent sunlamps for approximately one minute with the silver bromide/silver iodide-containing film behind the lettered film. Upon removal from the lamps, the top film was peeled off and it was found that the image of the letter was visible (as a semi-transparent white-unreduced portion) on a black background of reduced silver in the bottom film. The resulting film was then washed thoroughly in a bath of saturated sodium thiosulfate to remove unreduced silver halide and silver nitrate to "fix" the image. The excellent physical properties of the base polyacrylonitrile film were virtually unaffected by the treatment.

*Example 3*

A sample of two-way stretched polyacrylonitrile film, 2 mils thick, was immersed in a saturated solution of silver nitrate for approximately 30 seconds. The film was blotted dry with a paper towel and placed on a glass plate. A 10% aqueous solution of sodium chloride was brushed onto the exposed surface of the polyacrylonitrile film with a cotton swab. The initially clear surface become nearly opaque and white upon this treatment with sodium chloride.

A photographic image was produced on this film by following the procedure described in Example 2. The film was washed with saturated sodium thiosulfate solution to "fix" the image and then dried. The film had excellent physical properties.

*Example 4*

A sample of two-way stretched polyacrylonitrile film, 2 mils thick, was immersed in a saturated solution of silver nitrate for approximately 30 seconds. The film was blotted dry with a paper towel and a 50/50 weight percent mixture of chlorine and bromine was passed over the surface on one side of the film for approximately 30 seconds. The initially clear surface became nearly opaque and slightly yellow in color.

A photographic image was produced on the film by following the procedure described in Example 2. After "fixing" the image and drying, the film showed the same high level of physical properties as the original polyacrylonitrile base film.

Having fully disclosed the invention, what is claimed is:

1. A process comprising the steps, in sequence, of treating at least one surface of an oriented polyacrylonitrile film with an aqueous solution of silver nitrate for a time sufficient to impregnate said film to at least 1%, but not more than 50%, of the thickness of said film with said solution; removing excess silver nitrate solution from the surface of said film; exposing said treated film to at least one halogen selected from the group consisting of bromine, chlorine and iodine, said halogen in a form selected from the group consisting of halogen acid, halogen alkali metal salt and free halogen to convert said silver nitrate to silver halide particles; and drying said particle-containing film.

2. A process comprising the steps, in sequence, of treating at least one surface of an oriented polyacrylonitrile film with an aqueous solution of silver nitrate for a time sufficient to impregnate said film to at least 1%, but not more than 50%, of the thickness of said film with said solution; removing excess silver nitrate solution from the surface of said film; exposing said treated film to at least one gas selected from the group consisting of hydrogen bromide, hydrogen iodide, hydrogen chloride, bromine, iodine and chlorine to convert said silver nitrate to silver halide particles; and drying said particle-containing film.

3. A process comprising the steps, in sequence, of treating at least one surface of an oriented polyacrylonitrile film with an aqueous solution of silver nitrate for a time sufficient to impregnate said film to at least 1%, but not more than 50%, of the thickness of said film with said solution; removing excess silver nitrate solution from the surface of said film; treating at least one surface of said film with an aqueous solution containing at least one soluble halide selected from the group consisting of alkali metal bromide, alkali metal iodide, alkali metal chloride, hydrogen bromide, hydrogen iodide and hydrogen chloride to convert said silver nitrate to silver halide particles; and drying said particle-containing film.

4. A photographic film comprising an oriented polyacrylonitrile film impregnated with 0.5–65% by weight of particles of at least one silver halide selected from the group consisting of silver bromide, silver iodide and silver chloride to a depth of 1–50% of the thickness of said oriented polyacrylonitrile film.

5. A photographic film as in claim 4 wherein said oriented polyacrylonitrile film is biaxially oriented polyacrylonitrile film which has been biaxially oriented by stretching at least 1.5 times its original dimensions in each of two mutually perpendicular directions.

References Cited in the file of this patent

UNITED STATES PATENTS

| 984,886 | Brandenberger | Feb. 21, 1911 |
| 2,706,728 | Coover et al. | Apr. 19, 1955 |

FOREIGN PATENTS

| 147,451 | Japan | Dec. 29, 1941 |

OTHER REFERENCES

Cyanamid's Nitrogen Chemical Digest, The Chemistry of Acrylonitrile, pp. 51–56, American Cyanamid Company, New York, January 1951.